US012654367B2

(12) United States Patent
Siltamaeki et al.

(10) Patent No.: US 12,654,367 B2
(45) Date of Patent: Jun. 16, 2026

(54) MOLD AND METHOD FOR MANUFACTURING A COMPONENT BY MOLDING AND COMPONENT THEREOF

(71) Applicant: KURTZ GMBH & CO. KG, Kreuzwertheim (DE)

(72) Inventors: Jarkko Siltamaeki, Fuerth (DE); Bastian Gothe, Erlangen (DE); Helge Weiger, Nuremberg (DE); Andreas Seefried, Veitsbronn (DE); Maximilian Drexler, Wilhermsdorf (DE); Daniel S. Price, Herzogenaurach (DE); Dietmar K. Drummer, Erlangen (DE); Kevin Schneider, Erlangen (DE)

(73) Assignee: KURTZ GMBH & CO. KG, Kreuzwertheim (DE)

( * ) Notice: Subject to any disclaimer, the term of this patent is extended or adjusted under 35 U.S.C. 154(b) by 230 days.

(21) Appl. No.: 18/261,844

(22) PCT Filed: Jan. 25, 2022

(86) PCT No.: PCT/EP2022/051653
§ 371 (c)(1),
(2) Date: Jul. 18, 2023

(87) PCT Pub. No.: WO2022/161958
PCT Pub. Date: Aug. 4, 2022

(65) Prior Publication Data
US 2024/0075658 A1      Mar. 7, 2024

(30) Foreign Application Priority Data

Jan. 28, 2021    (DE) ..................... 10 2021 101 930.3
Jun. 11, 2021    (DE) ..................... 10 2021 115 116.3

(51) Int. Cl.
*B29C 35/08* (2006.01)
*B29C 44/34* (2006.01)
(Continued)

(52) U.S. Cl.
CPC ...... *B29C 35/0805* (2013.01); *B29C 44/3415* (2013.01); *B29C 44/58* (2013.01);
(Continued)

(58) Field of Classification Search
CPC .. B29C 35/0805; B29C 44/3415; B29C 44/58
See application file for complete search history.

(56) References Cited

U.S. PATENT DOCUMENTS

| | | | |
|---|---|---|---|
| 2,626,428 A | 1/1953 | Bosomworth |
| 4,298,324 A | 11/1981 | Soulier |
| | (Continued) | |

FOREIGN PATENT DOCUMENTS

| | | |
|---|---|---|
| DE | 10117979 A1 | 8/2002 |
| DE | 202016104341 U1 | 4/2017 |
| | (Continued) | |

OTHER PUBLICATIONS

International Search Report and Written Opinion of the International Searching Authority, mailed on May 16, 2022, from International Application No. PCT/EP2022/051653, filed on Jan. 25, 2022. 19 pages.
(Continued)

*Primary Examiner* — Stella K Yi
(74) *Attorney, Agent, or Firm* — HoustonHogle LLP

(57) ABSTRACT

The present invention relates to a mold for molding a component, in particular a particle foam part and a method for manufacturing the component using such a mold. In one embodiment, a mold for molding a component comprises (a.) a mixture of a polymer material and a filler material, (b.) wherein the filler material is adapted to allow a heating of
(Continued)

100    105b

120

Prior art 105a    120    105c

Figure 1:
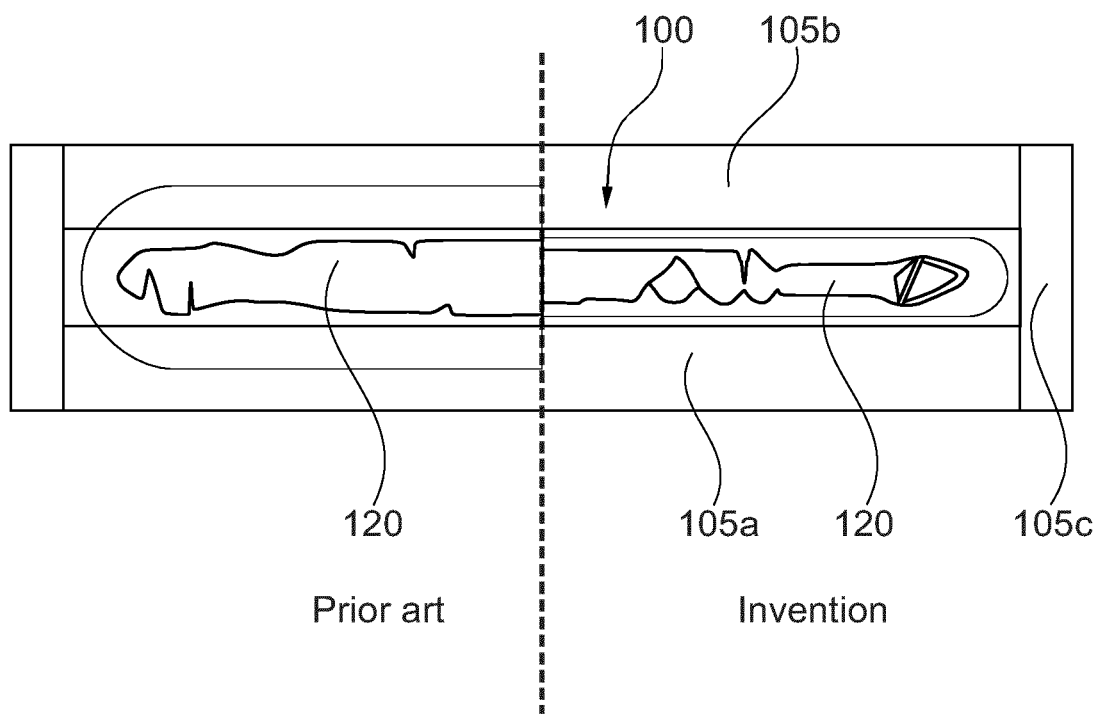

Invention the component inside the mold by means of an electromagnetic field.

22 Claims, 11 Drawing Sheets

(51) Int. Cl.
    *B29C 44/58*         (2006.01)
    *B29K 105/04*      (2006.01)

(52) U.S. Cl.
    CPC ........................... *B29C 2035/0861* (2013.01);
        *B29K 2105/048* (2013.01); *B29K 2901/12*
        (2013.01); *B29K 2995/0006* (2013.01)

(56) References Cited

U.S. PATENT DOCUMENTS

| | | | |
|---|---|---|---|
| 4,441,876 | A | 4/1984 | Marc |
| 11,358,310 | B2 | 6/2022 | Romanov et al. |
| 2018/0056551 | A1 | 3/2018 | Droste |

| | | | | |
|---|---|---|---|---|
| 2018/0154598 | A1* | 6/2018 | Kurtz | ................. B29D 35/0063 |
| 2020/0331178 | A1* | 10/2020 | Lin | ......................... B29C 44/58 |
| 2021/0107188 | A1 | 4/2021 | Weiger et al. | |

FOREIGN PATENT DOCUMENTS

| | | | |
|---|---|---|---|
| DE | 102016100690 A1 | | 7/2017 |
| DE | 102016123214 A1 | | 6/2018 |
| DE | 102019215838 A1 | | 4/2021 |
| EP | 3170641 A1 | | 5/2017 |
| EP | 3338984 A2 | | 6/2018 |
| WO | WO2009054567 | * | 4/2009 |

OTHER PUBLICATIONS

Ai-Hartomy et al. "Influence of Carbon Black's Structure and Specific Surface Area on the Dielectric and Microwave Properties of Filled Rubber Composites." Kgk-rubberpoint.de, Sep. 1, 2011, pp. 8.

International Preliminary Report on Patentability, mailed on Aug. 10, 2023, from International Application No. PCT/EP2022/051653, filed on Jan. 25, 2022. 12 pages.

\* cited by examiner

Prior art                                    Invention

MOLD AND METHOD FOR MANUFACTURING A COMPONENT BY MOLDING AND COMPONENT THEREOF

RELATED APPLICATIONS

This application is a § 371 National Phase Application of International Application No. PCT/EP2022/051653, filed on Jan. 25, 2022, now International Publication No. WO 2022/ 161958, published on Aug. 4, 2022, which International Application claims priority to German Application No. 10 2021 115 116.3, filed on Jun. 11, 2021, and German Application No. 10 2021 101 930.3, filed on Jan. 28, 2021, the teachings of which are incorporated herein by reference in their entirety.

1. TECHNICAL FIELD

The present invention relates to a mold for molding a component, in particular a particle foam part, a method for manufacturing the component using such a mold.

2. PRIOR ART

The use of particle foam materials, i.e. materials made from individual particles of expanded plastic materials, has found its way into the manufacture of different kinds of products, such as packaging material, cushioning elements for sports apparel, thermal isolation elements and mechanical functional elements. Particle foam parts are used as isolation panels for buildings and also as thermal isolation elements in automotive and e.g. in fuel cell apparatus. Such particle foam parts are very well shock absorbing and also electrical isolating so that they are used for different purposes. The individual particles can be made from different polymer material and have different properties accordingly. There is stiff material such as ePP (expanded Polypropylene) or elastic material such as eTPU (expanded thermoplastic Polyurethane). The particles (also often known as beads) are fused at their surfaces by subjecting them to pressurized steam within a mold (often called "steam chest molding" in the art).

However, conventional molds for steam chest molding are often not adapted to the specific requirements of the used materials. For example, the steam chest molding process of a particle foam parts made from particles with a conventional mold requires a large amount of energy for heating the mold, as conventional molds typically have a high mass. Moreover, the cooling process of such molds is slow and therefore leads to extended cycle times. Finally, steam chest molding particle foam parts from particles requires to uniformly supplying the pressurized steam to the particles in order to achieve a homogeneous interconnection of the particles. Therefore, conventional molds are often not adapted to such a uniform medium supply.

Energy carriers other than pressurized steam have also been considered. In particular, a method for the manufacture of a particle foam parts that comprises loading a mold with a first material comprising particles of an expanded material and fusing the surfaces of the particles by supplying energy in the form of at least one electromagnetic field has been described in DE 10 2016 100 690 A1, DE 10 2016 123 214 A1, and DE 20 2016 104 341 U1. However, these methods leave still room for improvement, because they do not yet take full account of the specific material characteristics of the mold material that, in particular, for the manufacture of modern performance particle foam parts are necessary.

As mentioned above steam chest molding needs more energy and the production rate is lower in comparison to a process using electromagnetic waves, such as RF radiation. Furthermore, the use of electromagnetic waves makes it easier to fuse particles made of polymer material having a high softening temperature.

The steam temperature is limited by the pressure applied in the mold. This means even if more steam is introduced into the mold the polymer material can never be heated above the maximum steam temperature. On the other hand heating with electromagnetic waves does not have a natural temperature limit. If to much energy is supplied by means of the electromagnetic waves then there is a danger of burning segments of the particle foam part. Therefore, it is particularly important that the heat is evenly distributed in the mold if it is supplied by means of electromagnetic waves. But with an evenly distributed heat supply the fusing quality of electromagnetic wave heating can be significantly improved over the quality achievable by steam chest molding. This is particularly the case if the particle foam parts comprise a certain thickness of some cm.

DE 101 17 979 A1 describes a molding tool for manufacturing molding parts from plastic, wherein the molding parts are heated using microwave radiation. The molding tool is primarily build from a duroplastic material and may be strengthened using quartz and/or glass particles, preferably silicon oxide and/or aluminum oxide particles.

In DE 10 2019 215 838 A1 a mold insert for use in a form for manufacturing damping elements for e.g. sneakers is disclosed, wherein an electromagnetic field is used to heat and glue together a source material. The mold insert is e.g. composed of a polymer resin filled with ceramics.

In EP 3 170 641 A1 an apparatus for manufacturing a three-dimension, thermoplastic firing skin is disclosed. The apparatus comprises a first and a second half-form that are open- and closable against one another and form a molding tool. In closed condition, the first and second half-forms form a firing skin space, that can be filled with liquid plastic material using a plastic feed. In turn the liquid plastic material is cured by heating with an electromagnetic alternating field. After cool down, the firing skin can be unloaded from the molding tool.

It is an object underlying the present invention to overcome said disadvantages of the prior art and to provide an improved mold for molding a component, in particular a particle foam part.

3. SUMMARY OF THE INVENTION

This object is accomplished by the teachings of the independent claims. Advantageous embodiments are contained in the dependent claims.

In one embodiment, a mold for molding a component, in particular a particle foam part, comprises (a.) a mixture of a polymer material and a filler material, (b.) wherein the filler material is adapted to allow a heating of the component inside the mold by means of an electromagnetic field.

The inventors of the present invention have surprisingly found that such a mold provides an improved approach for particle foam parts. By using such a mixture of a polymer material and a filler material the specific characteristics of the mold material can be significantly improved without deteriorating the remaining material characteristics of the mold, e.g. its stability, during the molding process. Moreover, the use of an electromagnetic field, in particular electromagnetic radiation, for heating the particle foam part inside the mold allows the manufacture of components with various thicknesses and complex geometry, too, since the energy for heating is not coupled to any kind of media transport, for example, the introduction of pressurized steam. The electromagnetic radiation may be chosen such that it permeates the mold loaded with the material for the particle foam part essentially homogeneously and supplies an essentially constant amount of energy to all portions of the particle foam part, such that a homogeneous and constant molding is achieved throughout the entire particle foam part and in every depth of the particle foam part.

It is explicitly mentioned at this point that, for clarity reasons, a filler material may be a solid additive incorporated into the polymer material. In this way, the filler material may be a functional filler used to improve the performance of the polymer mold material. In other words, when added to the polymer material, a particular property of the polymer mold material is improved, up to a certain extent, as the amount of filler material increases. Moreover, mixtures of fillers can help to "tailor" the material characteristics and balance mechanical performance with dielectric behaviour of the whole mold.

The filler material can also be used to adapt mechanical performance and/or dielectric behaviour of the whole mold for fusing foamed particles for different types of polymer materials. The different types of polymer material cannot only differ by the chemical composition but also by its physical parameters. E.g. there are eTPU particles made of the same chemical composition but having a different density. The particle foam part made of particles with a lower density is softer and lighter as the same kind of particle foam part made of the particles with a higher density. A higher density means that there is more polymer material in the same volume. The more polymer material is in the mold the better the electromagnetic waves can be absorbed. Thus a different density of polymer material can lead to a different heat distribution. This is particularly the case if the particle foam part has a varying thickness. Both the specific density of the foam particles as well as the chemical composition can have a strong impact on the heat absorbtion.

The filler material may be adapted to increase the thermal conductivity of the mold. As a consequence, the loss of heat energy when heating the mold as thermal inflow is significantly increased, because the heat flows away from the mold. Moreover, the increased thermal conductivity of the mold also improves the cooling process as thermal outflow after molding which is further supported by the mixture of a polymer material and a filler material according to the present invention. In addition, there is no further need for additional external or internal cooling of the component so that the whole molding process is simplified. Summarizing, the overall productivity of the manufacturing process for a particle foam part can be increased by such a mold.

The term "thermal conductivity", as used in the present application, refers to the ability of a mold material to conduct heat. In other words, the thermal conduction is defined as the transport of energy due to random molecular motion across a temperature gradient. It is distinguished from energy transport by convection and molecular work in that it does not involve macroscopic flows or work-performing internal stresses. In the International System of Units (SI), the thermal conductivity is measured in watts per meter and kelvin (W/(m·K)).

The filler material may be adapted to increase the permittivity of the mold compared to the component. Moreover, the filler material may comprise a dielectric material, in particular, a mixture of at least two inorganic materials, preferably at least one of the following: a metal nitride, a metal oxide, a metal carbide, a metal sulfide, a metal silicate, a silicon carbide and silicon nitride, most preferably boron nitride, BN. The permittivity of the mold has a direct influence on the field strength of the electromagnetic field or electromagnetic radiation inside the mold (for a constant 'external' field being applied to the mold), as the skilled person understands, and will also influence the field distribution (e.g., the local value of the field strength) inside the mold. A further advantage of using an increased permittivity of the mold to influence the electromagnetic field distribution is that filler materials with a wide variety of permittivity-values are known and available, such that a large degree of tuning and adaption is possible in this manner, by choosing and/or combining different filler materials. Moreover, an increased permittivity of the mold may indirectly reduce the loss of heat energy during the molding process, in that the electromagnetic field density is concentrated on the component material—and away from the mold material itself.

Furthermore, the filler material may comprise at least one of the following: a mixture of a carbon material and an inorganic material, carbon fiber, glassy carbon, carbon nanotubes, carbon nanobuds, aerographite, linear acetylenic carbon, q-carbon, graphene, a salt, a monocrystalline powder, a polycrystalline powder, an amorphous powder, a glass fiber. Besides the effects mentioned above, fibers or fiber composite materials are lightweight yet exceptionally strong. In particular, glass or glass fibers are fairly cheap and are moisture resistant as well as have a high strength to weight ratio. Therefore, the mold materials may influence the performance of the whole process and a tailored selection of mold materials of different dielectric properties allows for achieving optimal properties for efficient dielectric heating and subsequent cooling. Moreover, a certain range of electrical resistivity and properties related to mechanical stability may also be considered in the selection of the materials.

All of these described embodiments with different filler materials having different shapes, optical, thermal and electrical properties or material characteristics follow the same idea of achieving optimal properties for efficient molding by dielectric heating of the particle foam part inside the mold and the subsequent cooling of the whole mold. For example, both reduced cycle times when manufacturing the particle foam part and a high quality of the particle foam part may be provided with the mold of the present invention.

The mixture may comprise the filler material in an amount of 1 to 75% by volume, in particular 1 to 30% by volume, preferably 1 to 25% by volume, more preferably 1 to 20% by volume, most preferably 5 to 20% by volume or the mixture may comprise the filler material in an amount of 10 to 40% by volume, in particular 15 to 35% by volume. The indicated values have been found to provide a reasonable compromise between optimized optical properties for efficient dielectric heating and sufficient thermal properties to provide increased thermal conductivity of the mold for the subsequent cooling.

The polymer material may comprise a thermoplastic material, preferably at least one of the following: polyethylene terephthalate, PET, polybutylene terephthalate, PBT, polyoxymethylene, POM, polyamide-imide, PAI, polycarbonate, PC, polyketones, PK, polyether ether ketone, PEEK, or polyethylene, PE. Moreover, the polymer material may comprise a foamed material. These materials have turned out advantageous and may hence be used in the context of the present invention. For example, POM has a dielectric loss factor D of approximately 0.008 for radio frequency radiation. This material may thus be essentially transparent to radio frequency radiation, since it absorbs only a small part of the electromagnetic radiation and may, due to the relatively low loss factor, be formed with a certain thickness.

The polymer material may be adapted to increase the permittivity of the mold compared to the component. For example, certain polymer materials from certain polymer grades may be used due to their high intrinsic permittivity compared to the component material. Therefore, since the permittivity of the mold has a direct influence on the field strength of the electromagnetic field or electromagnetic radiation inside the mold, an optimized thermal inflow and outflow of the mold may be provided in that the electromagnetic field density is concentrated on the component material. Examples may comprise at least one of polyacrylonitrile, PAN, polyamide or polyethylene terephthalate, PET. In preferred embodiments, the mold may comprise a mixture of PET and 30% by volume of Aluminium oxide, $Al_2O_3$, or a mixture of POM and titanium dioxide ($TiO_2$).

The polymer material may be adapted to increase the dielectric loss factor of the mold. It is also conceivable that certain portions of the mold may be adapted to increase the dielectric loss factor. Such embodiments allow to selectively introduce excessive heat buildup in the whole mold or only at specific portions within the mold by means of high dielectric loss since the mold material may absorb a high amount of the electromagnetic radiation. Therefore, an optimized thermal inflow and outflow of the mold may also be provided. Examples may comprise at least one of polyketones, PK, polyvinylidene fluoride or polyvinylidene difluoride, PVDF or polyamide-imide, PAI. In a preferred embodiment, the mold may comprise a mixture of POM and titanium dioxide, $TiO_2$.

The molding process by dielectric heating and the subsequent cooling process of the particle foam part are much faster so that the productivity may be improved. Moreover, the homogeneous and constant molding allows the manufacture of a lightweight, durable particle foam part that offers different kinds of properties, such a thermal and/or electrical insolation, shock absorbing and other mechanical properties.

The invention further concerns a method for manufacturing a component, in particular a particle foam part, the method comprising the step of (a.) molding the component using a mold as described herein. Moreover, the method may further comprise at least one of the following steps: (b.) loading the mold with a first material for the component which comprises particles of an expanded material and (c.) heating the first material and/or the mixture of the polymer material and the filler material of the mold and/or a susceptor of the mold by means of an electromagnetic field. The susceptor may comprise at least one of the following materials: expanded polypropylene, ePP, polyurethane, PU, polylactide, PLA, polyether-block-amide, PEBA, or polyethylene terephthalate, PET.

The heating step may comprise the step of fusing the surfaces of the particles. As mentioned above, an electromagnetic field, in particular electromagnetic radiation, may be chosen such that it permeates the mold loaded with the particles essentially homogeneously and supplies an essentially constant amount of energy to all particles, such that a homogeneous and constant fusing of the particle surfaces is achieved throughout the entire component and in every depth of the component.

The particles for the component may comprise at least one of the following materials: expanded thermoplastic polyurethane, eTPU, expanded polyamide, ePA, expanded polyetherblockamide, ePEBA, polylactide, PLA, polyetherblock-amide, PEBA, polyethylene terephthalate, PET, polybutylene terephthalate, PBT, thermoplastic polyester ether elastomer, TPEE. For example, for use in the manufacture of particle foam parts, particles of eTPU, ePEBA and/or ePA have turned out advantageous and may hence be used in the context of the present invention.

The particles may be filled into the mold using conventional techniques known in the art, for example, pressure filling through a filling gate.

The particles may comprise a foamed material. For example, using a foamed material for both the particles and for the surface of the mold leads to a similar loss factor so that a substantially uniform heating of both the particles and the mold may be provided so that a better surface fusion of the component may be obtained.

The electromagnetic field may be in the radio frequency range of 30 kHz-300 GHz. The electromagnetic field may, for example, be supplied in the form of radiation in the microwave range, i.e. with a frequency in the range from 300 MHz-300 GHz.

Microwave generators are commercially available and may be implemented into a manufacturing device for using an inventive mold with comparatively little effort. In addition, it may be possible to focus the microwave radiation essentially onto a cavity of the mold in which the component material is loaded by a suitable device, such that the energy efficiency of a method using the mold is increased. Furthermore, the intensity and frequency of the microwave radiation may easily be changed and adapted to the respective requirements.

The electromagnetic field may be in the radio frequency range of 1 MHz-200 MHz, more preferably in the range of 1 MHz-50 MHz, most preferably in the range of 25-30 MHz. In a preferred embodiment, the electromagnetic field may have a frequency in the radio frequency range around 27.12 MHz. It is also conceivable that one or more radio frequencies or radio frequency ranges may be used.

Radio frequency generators are also commercially available and may be easily implemented in a manufacturing device. Moreover, also radio frequency radiation may be focused on the respective parts of the manufacturing device and its intensity and frequency may be adapted to the requirements. Radio frequency radiation has in comparison to microwave radiation a longer wavelength. This facilitates to achieve an even heat distribution, particularly if the particle foam parts have a dimension of at least 5 cm or at least 10 cm.

It is further possible that the electromagnetic field, in particular electromagnetic radiation, is supplied in a frequency range different from the frequency ranges mentioned above.

The mold may be further loaded with a second material, which remains essentially unaltered by the electromagnetic field. This may, for example, be a material the electromagnetic field permeates without being absorbed by the material to a noticeable degree. In particular, the second material may be free from electromagnetic field absorbing material. "Essentially unaltered" may mean that the second material does not melt or start melting or become softer or harder.

All described embodiments relate to improved methods of manufacturing a component, in particular a particle foam part. Further details and technical effects and advantages are described in detail above with respect to the mold.

The invention also concerns a component, in particular a particle foam part, manufactured with a method as described herein.

4. SHORT DESCRIPTION OF THE FIGURE

Figure 4A:
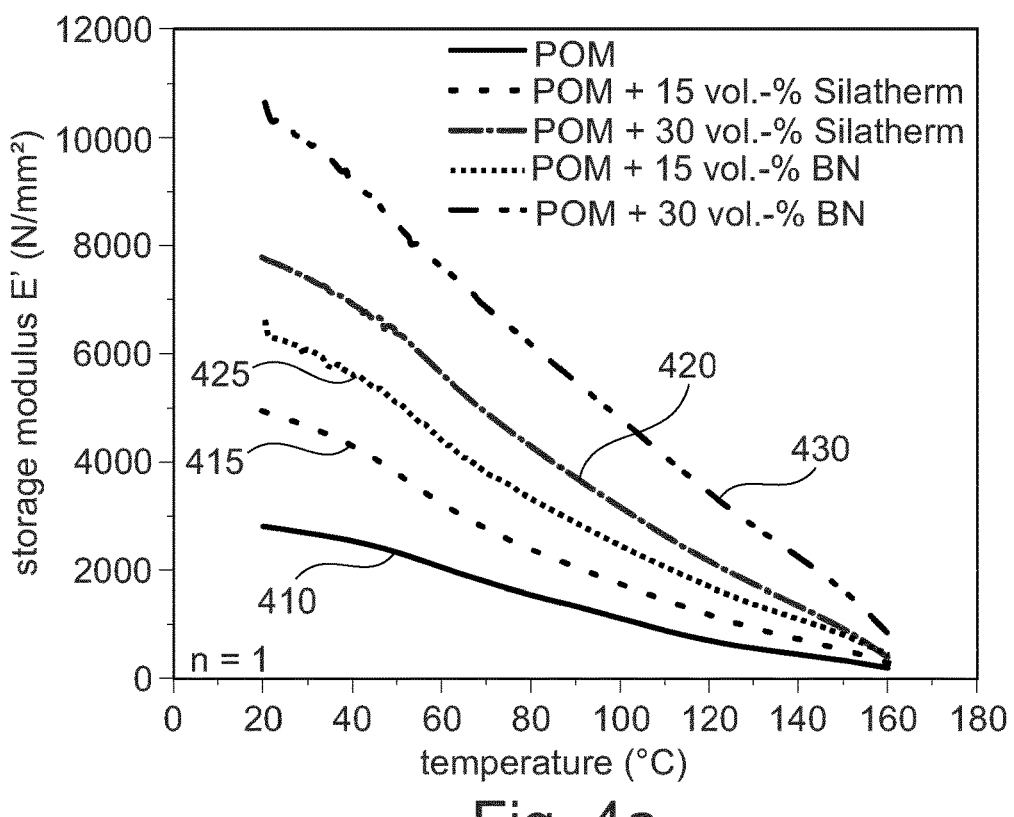
Figure 4B:
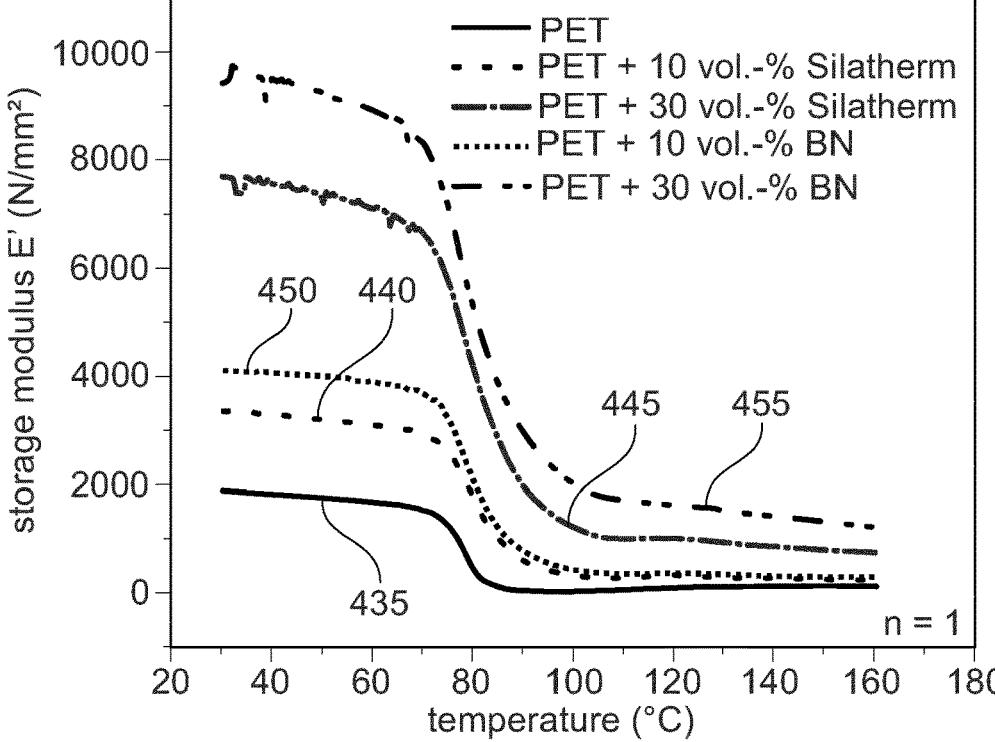
Figure 5A:
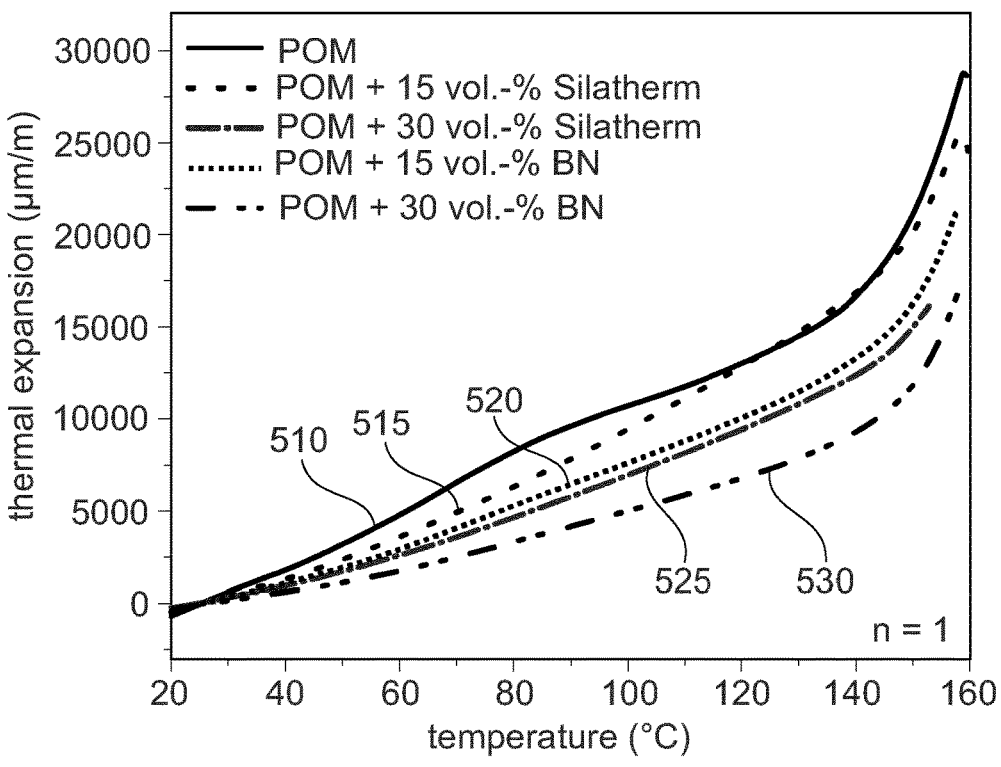
Figure 5B:
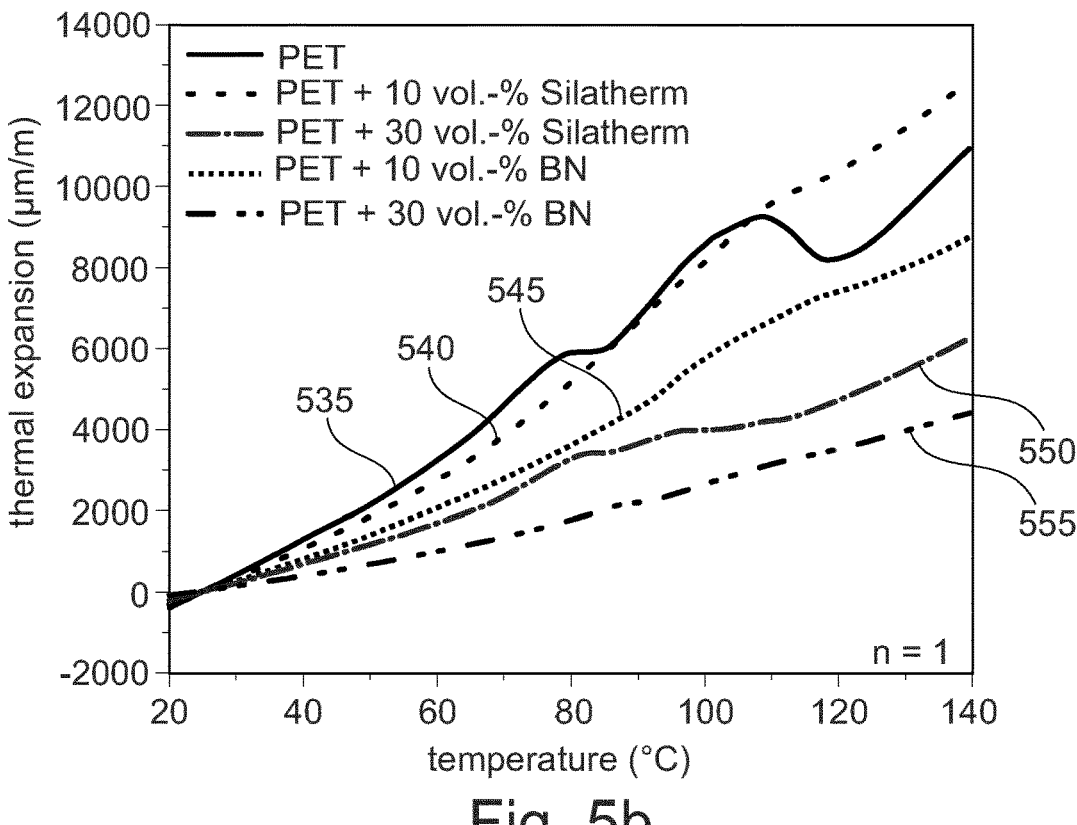
Figure 7:
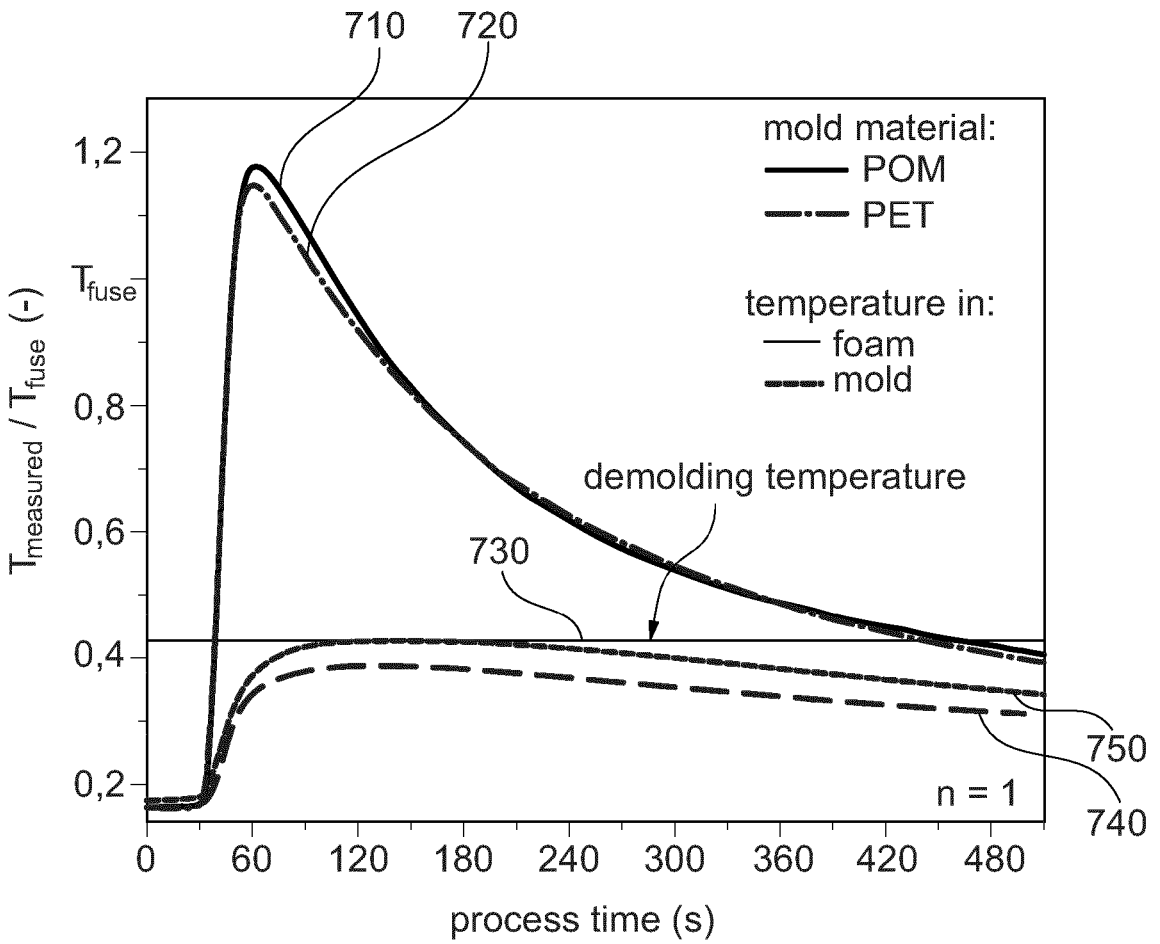
Figure 8A:
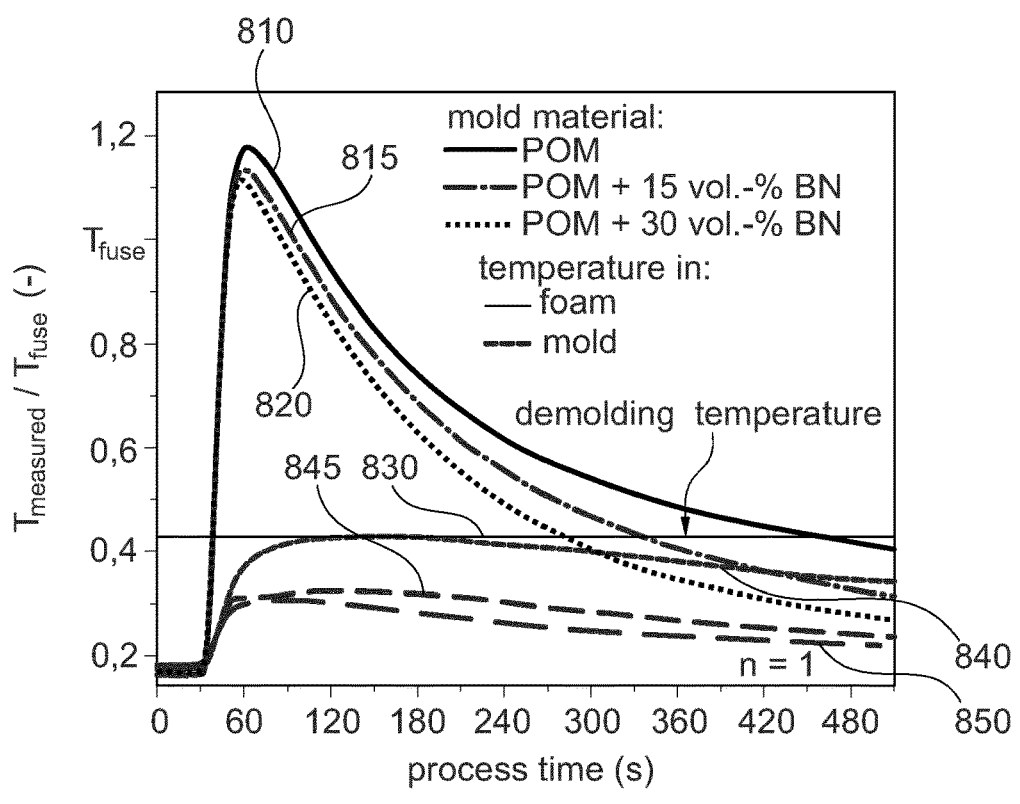
Figure 8B:
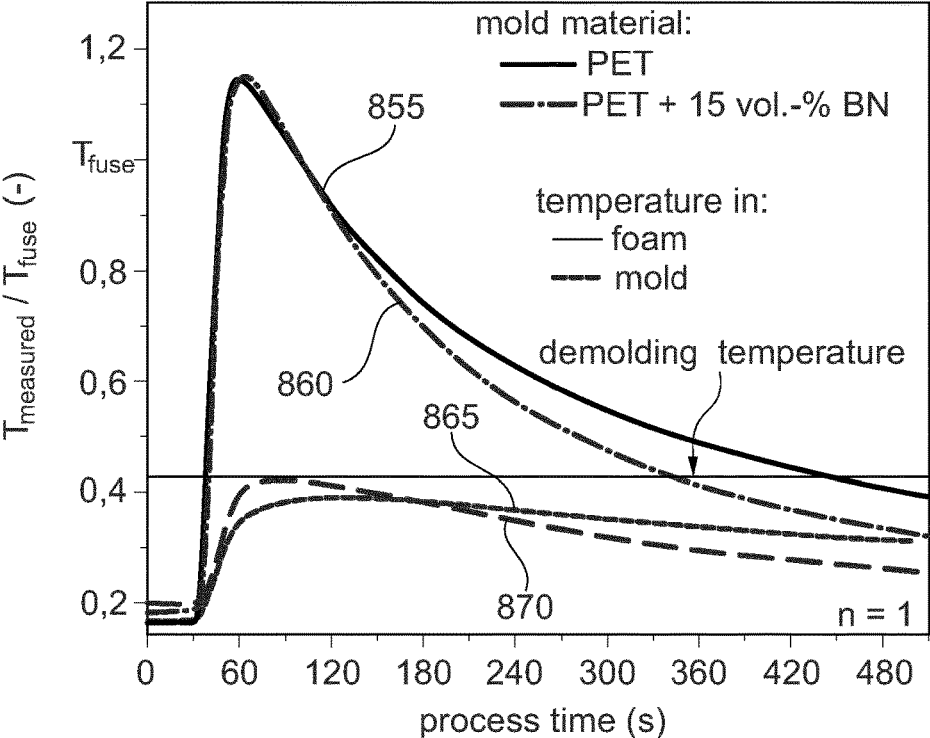

Possible embodiments of the present invention are further described in the following with reference to the following figures:

FIG. 1: illustrates the surprising effect of a particle foam part according to the present invention;

FIGS. 2a-2d: illustrate the permittivity of materials suitable for use as a mold according to the present invention;

FIGS. 3a-3d: illustrate the dielectric loss factor of materials suitable for use as a mold according to the present invention;

FIGS. 4a-4b: illustrate the storage modulus of materials suitable for use as a mold according to the present invention;

FIGS. 5a-5b: illustrate the thermal expansion of materials suitable for use as a mold according to the present invention;

FIGS. 6a-6d: illustrate the thermal conductivity of materials suitable for use as a mold according to the present invention;

FIG. 7: illustrates the improvement of process cycle time of materials suitable for use as a mold according to the present invention; and FIGS. 8a-8b: illustrate the improvement of process cycle time of materials suitable for use as a mold according to the present invention.

5. DETAILED DESCRIPTION OF PREFERRED EMBODIMENTS

Possible embodiments of the different aspects of the present invention are described in the following detailed description primarily with respect to molds for molding a particle foam part. However, it is emphasized, that the present invention is not limited to these embodiments. Rather, it may also be used for different kinds of particle foam parts in different kinds of industrial fields.

Reference is further made to the fact that in the following only individual embodiments of the invention can be described in more detail. However, the skilled person will understand that the optional features and possible modifications described with reference to these specific embodiments may also be further modified and/or combined with one another in a different manner or in different subcombinations without departing from the scope of the present invention. Individual features may also be omitted if they are dispensable to obtain the desired result. In order to avoid redundancies, reference is therefore made to the explanations in the preceding sections, which also apply to the following detailed description.

FIG. 1 illustrates the surprising effect of a mold 100 according to the present invention.

The embodiment of FIG. 1 shows a comparison of simulations for the thermal radiation, i.e. the heat radiation or temperature, of a conventional mold of the prior art and the mold 100 according to the present invention, wherein a particle foam part 120 is molded inside the two molds by dielectric heating and subsequent cooling. The comparison of their heat radiation is simulated after 10 minutes of cooling of the two molds and the particle foam part 120.

This comparison between the mold of the prior art and the invention on cooling performance improvement were created using a simulation model where both the dielectric heating phenomenon and the thermodynamic heat conduction were characterized by a fully coupled multiphysics simulation model. The model uses the finite element method for calculation of the thermal energy induced inside of the mold construction during the presence of a radio frequency electric field. Material models represent the dielectric properties of the particle component 120 and the parts of the mold 100 construction, and through standard dielectric heating equations the correlation of used materials to induced heating power can be calculated with partial differential equations.

The mold 100 according to the present invention comprises a mixture of a polymer material and a filler material, wherein the filler material is adapted to allow a heating of the particle foam part 120 inside the mold 100 by means of an electromagnetic field, in particular radio frequency radiation. As can be seen in FIG. 1, the filler material adapted to increase the thermal conductivity of the mold 100 shows a drastic decrease in cooling time for both the mold 100 and the particle component 120. Moreover, the inventors have found out that the increased thermal conductivity does not influence the dielectric heating process. The conventional mold of the prior art comprises polyethylene terephthalate, PET, and has a thermal conductivity of approx. 0.35 W/m·K.

In the exemplary embodiment of FIG. 1, the mold loco of the present invention comprises a mixture of polyethylene terephthalate, PET, and boron nitride, BN, as filler material in an amount of 30% by volume so that the mold 100 has a thermal conductivity of approx. 1.85 W/m·K, i.e. five times higher than for the conventional mold. The inventors have found out that this increased thermal conductivity leads to a significant reduction of the cooling time compared to the conventional mold.

In the case shown in FIG. 1, the mold 100 comprises a bottom part 105a, a top part 105b and a side part 105c. For example, the bottom part 1435a and the top part 105b of the mold 100 may be plates having dimensions of 200×200×10 mm$^3$. Other mold geometries as well as more or less parts of the mold 100 are also conceivable.

In another embodiment of the invention being experimentally investigated, the mold comprises a mixture of foamed PET and BN as filler material in an amount of 15% by volume, which leads to a thermal conductivity of approx. 0.85 W/m·K. The inventors have found out that this experimentally investigated embodiment leads to a cooling time of approx. 5.9 min compared to 10 min for the conventional mold as mentioned above. In other words, the cooling time is approx. reduced by 41%.

following FIGS. 2a-8b show the analysis of dielectric and thermal properties of different matrix materials comprising corresponding polymer and filler materials.

Figure 2A:
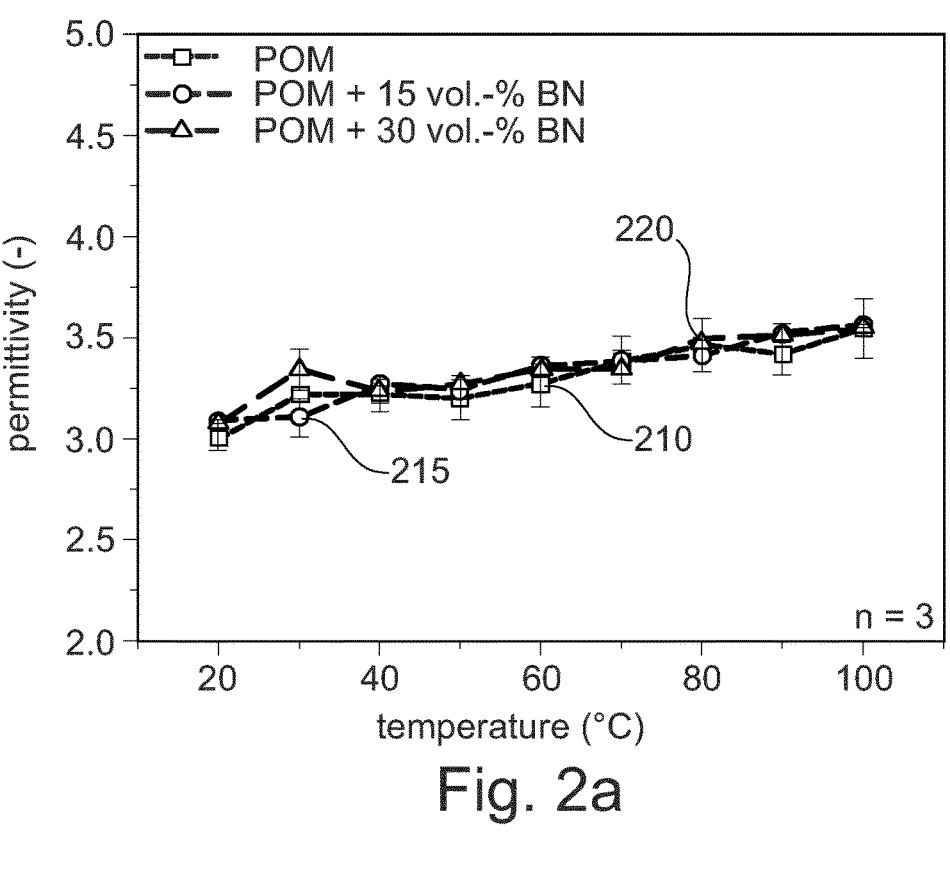

Values for the (relative) permittivity of materials with polyoxymethylene, POM, and polyethylene terephthalate, PET, over the temperature range from 20° C. to 100° C. (suitable for use in a mold 100), measured at a frequency of approx. 27.12 MHz, are shown in FIGS. 2a-2d:

Curve 210 (squares) in FIG. 2a shows the permittivity of POM without a filler material. Here, the permittivity measured is rising from 3.00 to 3.55, wherein the steady increase in permittivity may be caused by higher mobility of the polymer molecules resulting in better alignment to the electric field.

Curve 215 (circles) shows the permittivity of a mixture of POM and boron nitride, BN, as filler material in an amount of 15% by volume over the same temperature range as curve 210. The values of the permittivity also raise from 3.00 to 3.55.

Same applies for the values of the curve 220 (triangles) showing the permittivity of a mixture of POM and BN as filler material in an amount of 30% by volume.

Figure 2B:
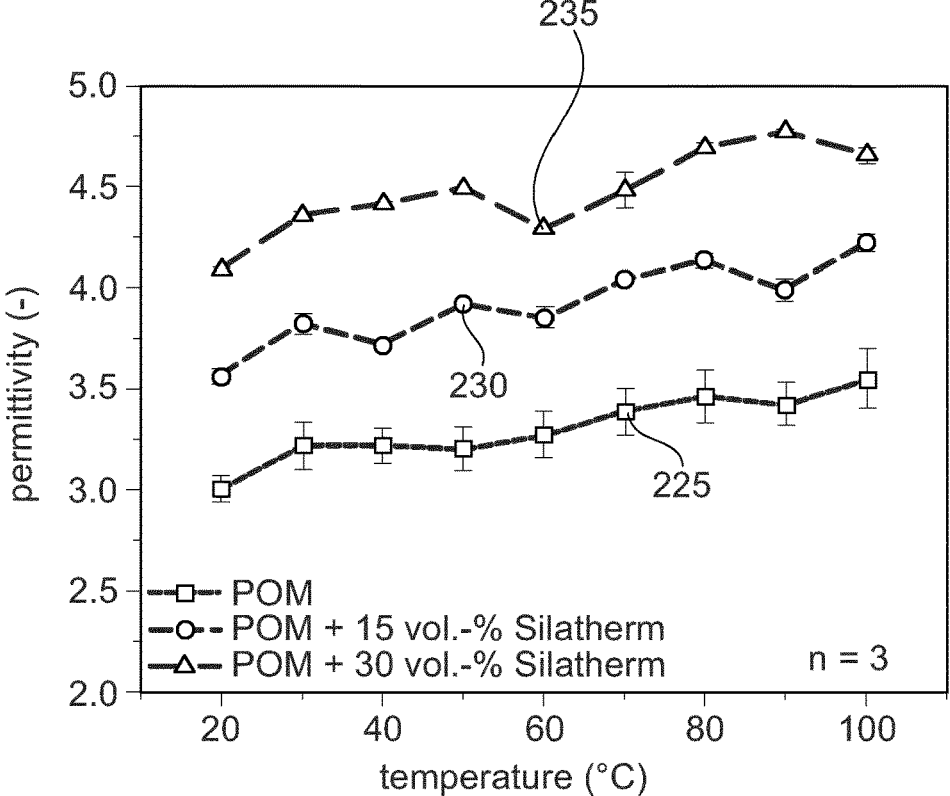

Curve 225 (squares) in FIG. 2*b* shows the permittivity of POM without a filler material, wherein the permittivity measured is also rising from 3.00 to 3.55, quite similar as curve 210 in FIG. 2*a*.

Curve 230 (circles) shows the permittivity of a mixture of POM and SILATHERM® (a mixture of $Al_2O_3$ and $SiO_2$) as filler material in an amount of 15% by volume.

Curve 235 (triangles) shows the permittivity of a mixture of POM and SILATHERM® in an amount of 30% by volume.

Here, the influence on the measured permittivity for the two filler materials BN and SILATHERM® is clearly different. BN, on the one hand, may have no significant influence on the permittivity of POM. Therefore, it may be assumed that its permittivity is close to that of POM. On the other hand, the permittivity with SILATHERM® is shifted to higher values with increasing filler content. The slope remains the same. This may suggest that the permittivity of SILATHERM® is higher than that of POM, but stable over the investigated temperature range. The steady increase may be caused by POM.

Figure 2C:
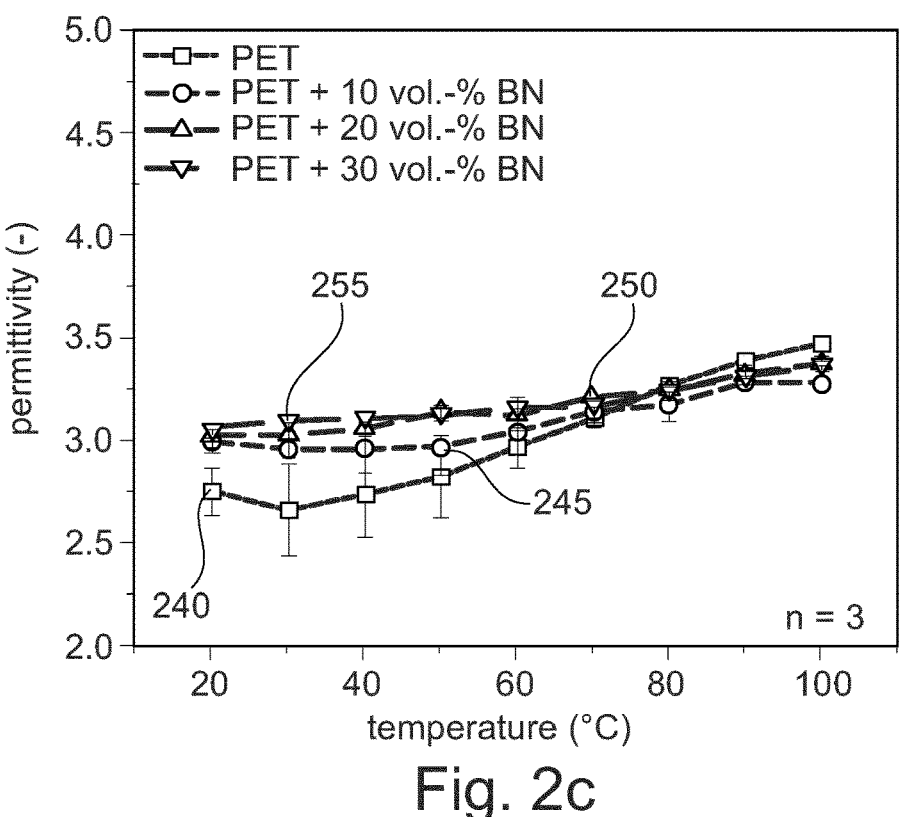

Curve 240 (squares) in FIG. 2C shows the permittivity of PET without a filler material. The permittivity of PET is rising with increasing temperature from 2.75 to a maximum of 3.48. Compared to POM of FIGS. 2*a* and 2*b*, its overall permittivity is lower for the investigated temperature range, but its gradient is bigger.

Curves 245 (circles), 250 (upward directed triangles) and 255 (downward directed triangles) show the permittivity of a mixture of PET and BN as filler material in an amount of 10% (circles), 20% (upward directed triangles) and 30% (downward directed triangles) by volume. The influence of BN is quite low, similar to POM as shown in FIG. 2*a*.

Figure 2D:
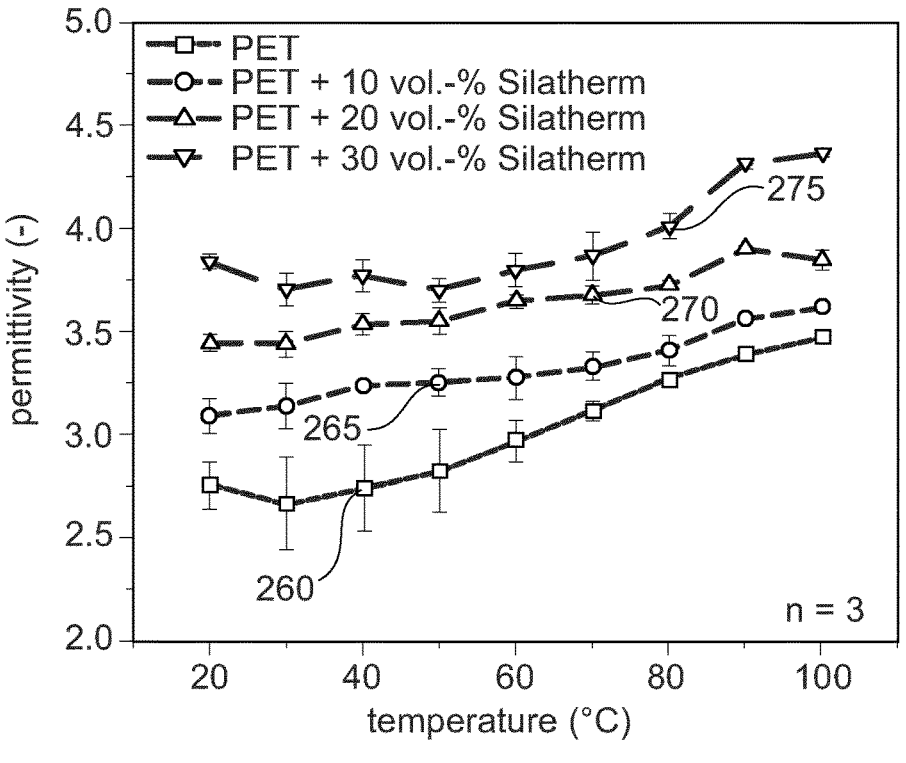

Curves 260 (squares), 265 (circles), 270 (upward directed triangles) and 275 (downward directed triangles) in FIG. 2*d* show the permittivity of PET without a filler material (squares) and a mixture with SILATHERM® as filler material in an amount of 10% (circles), 20% (upward directed triangles) and 30% (downward directed triangles) by volume. The increasing content of SILATHERM® may again lead to higher permittivity values. Compared to POM as shown in FIG. 2*b*, the maximum values for 30% by volume of SILATHERM® are lower. Since the permittivity of a component will be influenced by the material values, this result may be caused by the lower values of PET.

Figure 3A:
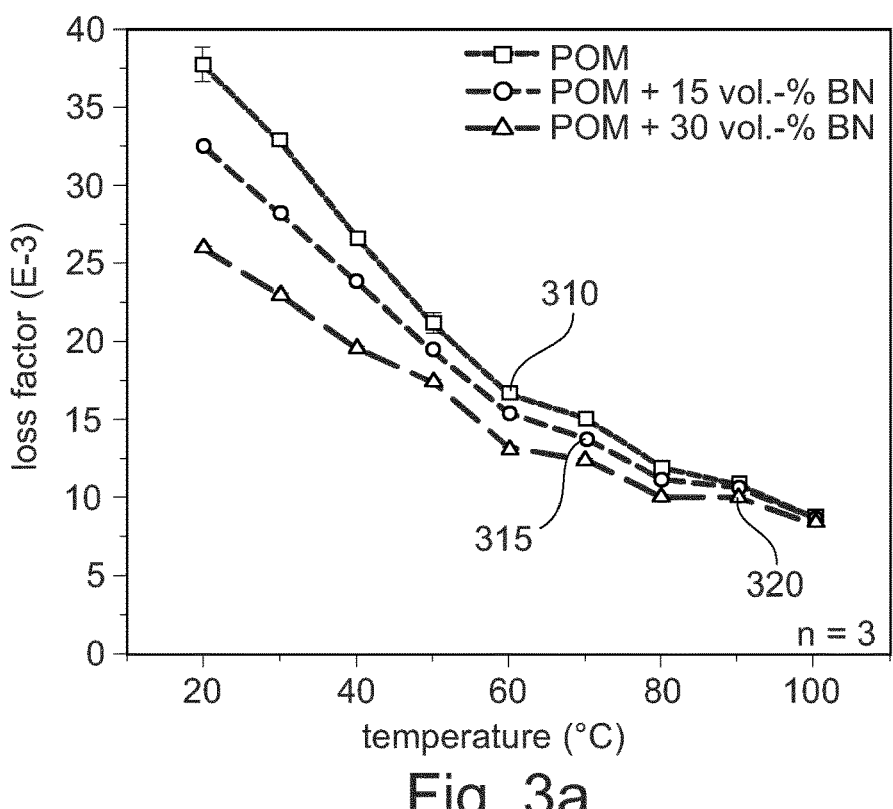

Values for the dielectric loss factor of materials with POM and PET together with BN or SILATHERM® as filler materials according to the invention over the temperature range from 20° C. to 100° C. (suitable for use in a mold 100) are shown in FIGS. 3*a*-3*d*:

Curve 310 (squares) in FIG. 3*a* shows the dielectric loss factor of POM without a filler material. Here, POM shows a decrease in the dielectric loss factor. Curve 315 (circles) shows the permittivity of a mixture of POM and BN as filler material in an amount of 15% by volume over the same temperature range as curve 310. The values of the curve 320 (triangles) show the permittivity of a mixture of POM and BN in an amount of 30% by volume.

The maximum dielectric loss factor for unfilled POM of 38 mU was measured at 20° C. and a temperature increase leads to a constant decrease in dielectric loss factor to a minimum of 8.6 mU at 100° C. The enhanced movement of molecules due to higher temperatures and the resulting reduction of chain-chain interaction may cause this behavior.

Figure 3B:
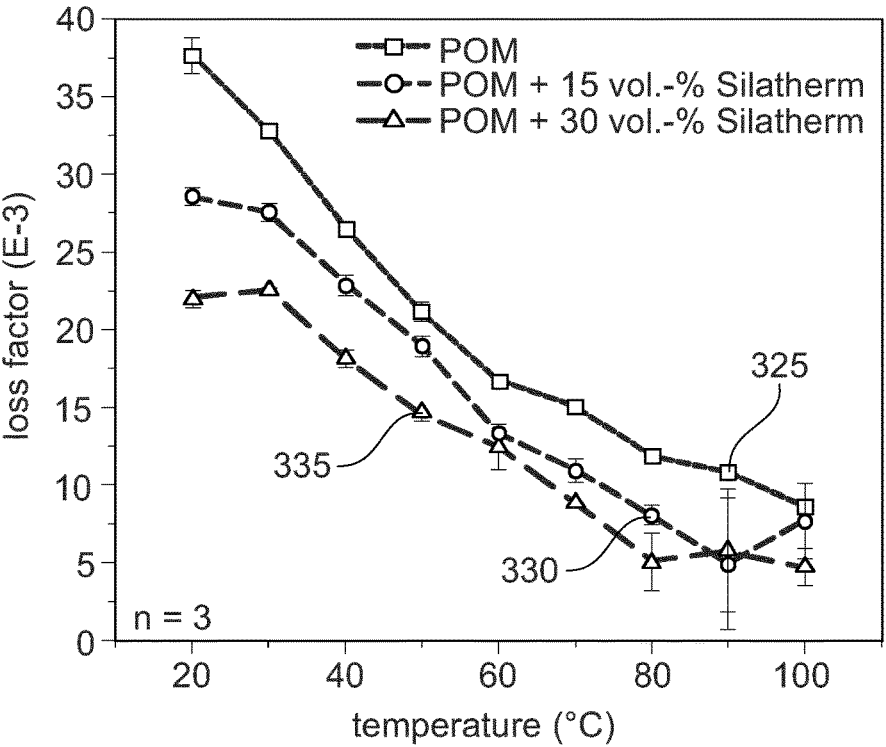
Figure 3C:
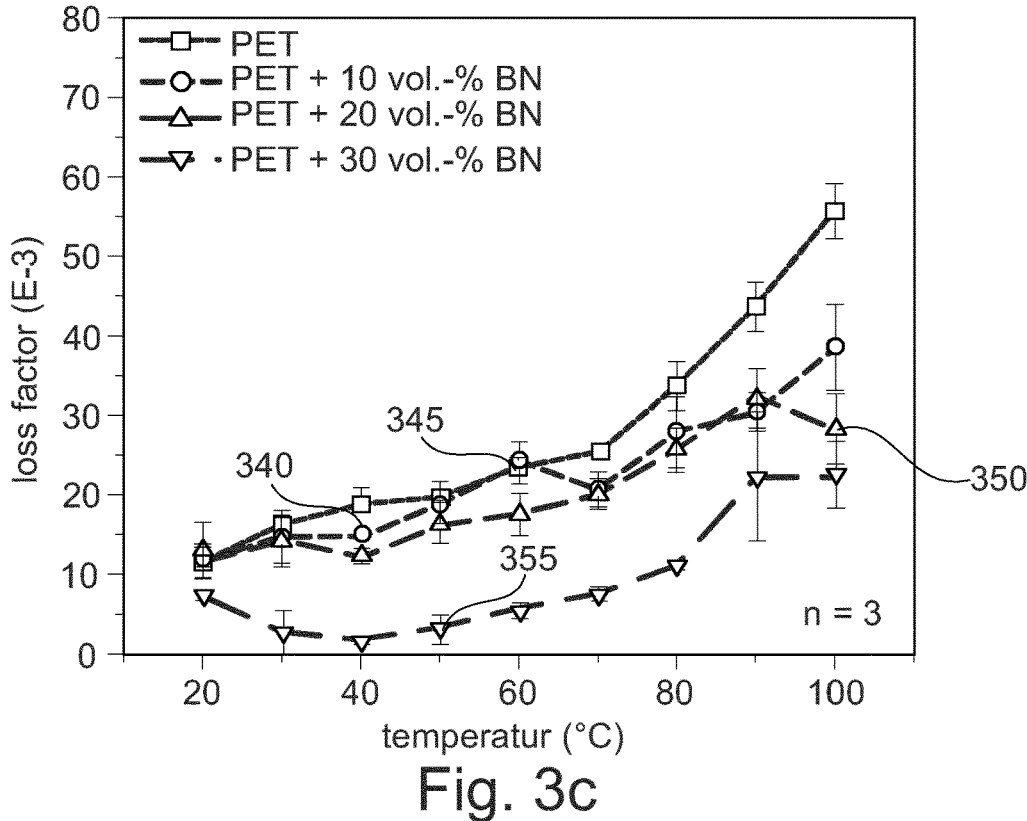

In FIG. 3*b*, curve 325 (squares) shows the dielectric loss factor of unfilled POM, curve 330 (circles) shows the dielectric loss factor of a mixture of POM and SILATHERM® in an amount of 15% by volume and curve 335 shows the dielectric loss factor of a mixture of POM and SILATHERM® as filler material in an amount of 30% by volume. For both fillers, a filler content-dependent shift to lower values was measured. However, the progression of the curves is slightly different. A volumetric content of 15 or 30% by volume of BN in FIG. 3*a* may reduce the measured loss to 32.5 mU and 27.0 mU respectively at 20° C. If a volume-dependent mixing of loss factors in combination with a dielectric loss factor of 5-10 mU for BN is assumed, the values nearly match with the volume percentage-dependent values. For increasing temperatures, the curves slowly approach the trace of pure POM and have nearly the same level at 100° C. In contrast, the use of SILATHERM® may lead to an overall shift to lower dielectric loss values. This may lead to the assumption that the dielectric loss factor of SILATHERM® may be close to 0 mU.

Curve 340 (squares) in FIG. 3*e* shows the dielectric loss factor of PET without a filler material. Curves 345 (circles), 350 (upward directed triangles) and 355 (downward directed triangles) show the dielectric loss factor of a mixture of PET and BN as filler material in an amount of 10% (circles), 20% (upward directed triangles) and 30% (downward directed triangles) by volume. PET shows a consistent increase in dielectric loss factor. The slopes of the measured curves 340-355 is nearly constant for the temperature range of 20 to 70° C. A further increase in temperature may lead to an enhanced rise in dielectric loss factor, wherein the dielectric loss of unfilled PET reaches from 12 mU (at 20° C.) up to 55 mU (100° C.). Here, the use of filler materials may again lead to a reduction of the measured values.

Figure 3D:
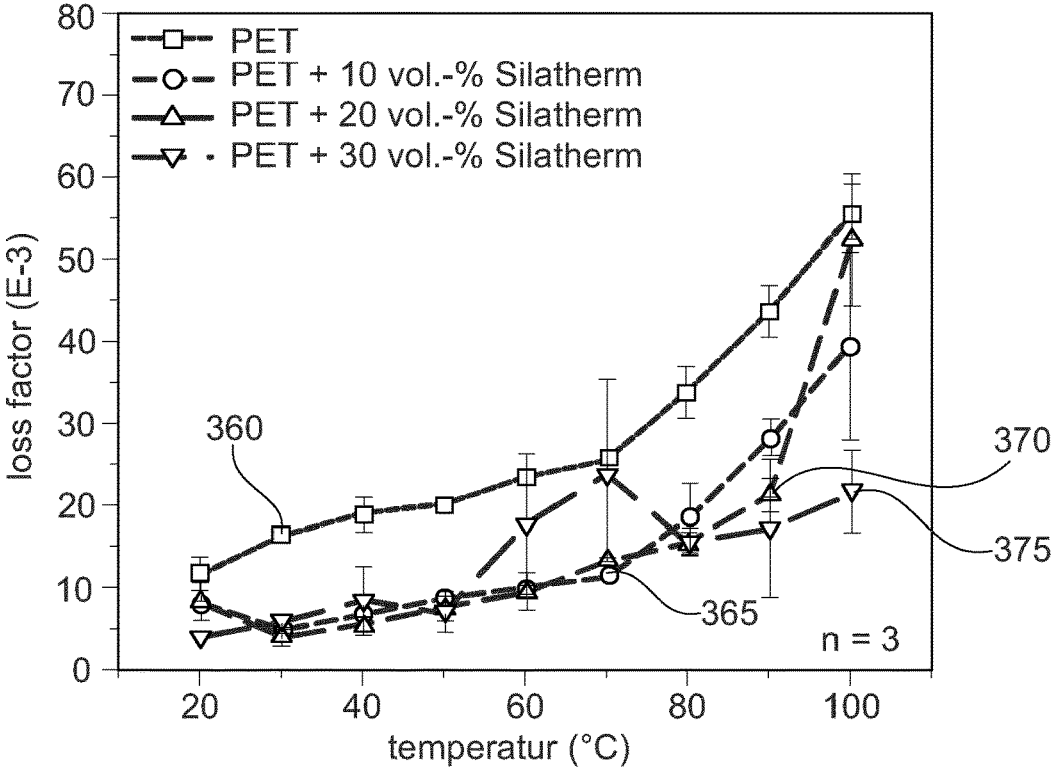

Curve 360 (squares) in FIG. 3*d* shows the dielectric loss factor of PET without a filler material. Curves 365 (circles), 370 (upward directed triangles) and 375 (downward directed triangles) show the dielectric loss factor of a mixture of PET and SILATHERM® as filler material in an amount of 10% (circles), 20% (upward directed triangles) and 30% (downward directed triangles) by volume.

Values for investigating the storage modulus of materials with POM or PET and filler materials according to the invention over the temperature range from 20° C. to 160° C. are shown in FIGS. 4*a* and 4*b*:

Curves 410, 415, 420, 425 and 430 show the storage modulus of a mixture of POM together with BN or SILATHERM® as filler materials in an amount of 15% or 30% by volume.

Curves 435, 440, 445, 450 and 460 show the thermal expansion of a mixture of PET together with BN or SILATHERM® as filler materials in an amount of 10% or 30% by volume.

POMs glass transition temperature can be measured at about 60° C. Therefore, a constant drop in mechanical properties in the investigated temperature range results. For the starting temperature of 20° C., a maximum of 2816 $N/mm^2$ was measured. The modulus drops continuously to a minimum of 205 $N/mm^2$ at 160° C.

By the use of fillers, the maximum value is raised. The course of the curves is, however, steeper, resulting in nearly the same minimum as the unfilled POM shows. The increase in storage modulus may be caused by the higher stiffness of the filler materials. Additionally, the geometry of the fillers has an influence, too. Because of its platelet structure, BN may lead to higher values of storage modulus than the irregular shaped SILATHERM®.

Values for investigating the thermal expansion of materials with POM or PET and filler materials according to the invention over the temperature range from 20° C. to 100° C. are shown in FIGS. 5a and 5b. The term "thermal expansion" of a component is composed of the values of the individual materials used and their concentration. Additionally, the thermal expansion is dependent on the temperature applied and is therefore not constant over the whole temperature range.

Curves 510, 515, 520, 525 and 530 show the thermal expansion of a mixture of POM together with BN or SILATHERM® as filler materials in an amount of 15% or 30% by volume.

Curves 535, 540, 545, 550 and 560 show the thermal expansion of a mixture of PET together with BN or SILATHERM® as filler materials in an amount of 10% or 30% by volume.

In general, components based on POM show higher values for thermal expansion than components based on PET. In the case of unfilled PET an unstable course of the curve, including a plateau at 85° C. and a local minimum at 120° C. can be seen, wherein the plateau may be caused by the glass transition of the material and a resulting relaxation of production-related stresses. The local minimum, however, may be possibly caused by a post crystallization of the material. Since the crystallization speed of PET is quite low, the crystallization may not be finished after the cooling in the injection molding process. These effects are not measured for filled PET components.

However, both fillers may cause a reduction in thermal expansions independent of the plastic materials used. For the same amount of fillers, the thermal expansion is lower for BN compared to SILATHERM®. The use of higher filler content leads to a further reduction in thermal expansion.

Moreover, since a mold may be fixed on an aluminum plate, the thermal expansion coefficients of both materials should be as close as possible to avoid thermally caused stresses. The thermal expansion coefficient of aluminum is 23.8 µm/m·K. and for a temperature range of 20° C. to 100° C. a mean thermal expansion coefficient for POM of 141.0 µm/m·K was measured. By the use of SILATHERM® with 30% by volume, it may be reduced to 91.3 µm/m·K. In combination with BN as filler material with 30% by volume, a coefficient of 65.1 µm/m·K could be achieved.

In the case of PET as shown in FIG. 5b, the initial value of 111.2 µm/m·K was reduced to 52.5 µm/m·K for SILATHERM® with 30% by volume. The same volumetric amount of BN may lead to a thermal extension coefficient of 34.3 µm/m·K which is quite close to that of aluminum. Thus, the component with a mixture of PET and BN with 30% by volume could be seen as the best material regarding thermal expansion.

Values for the thermal conductivity of POM and PET in combination with BN or SILATHERM® as filler materials with different filler concentrations are shown in FIGS.

Figure 6A:
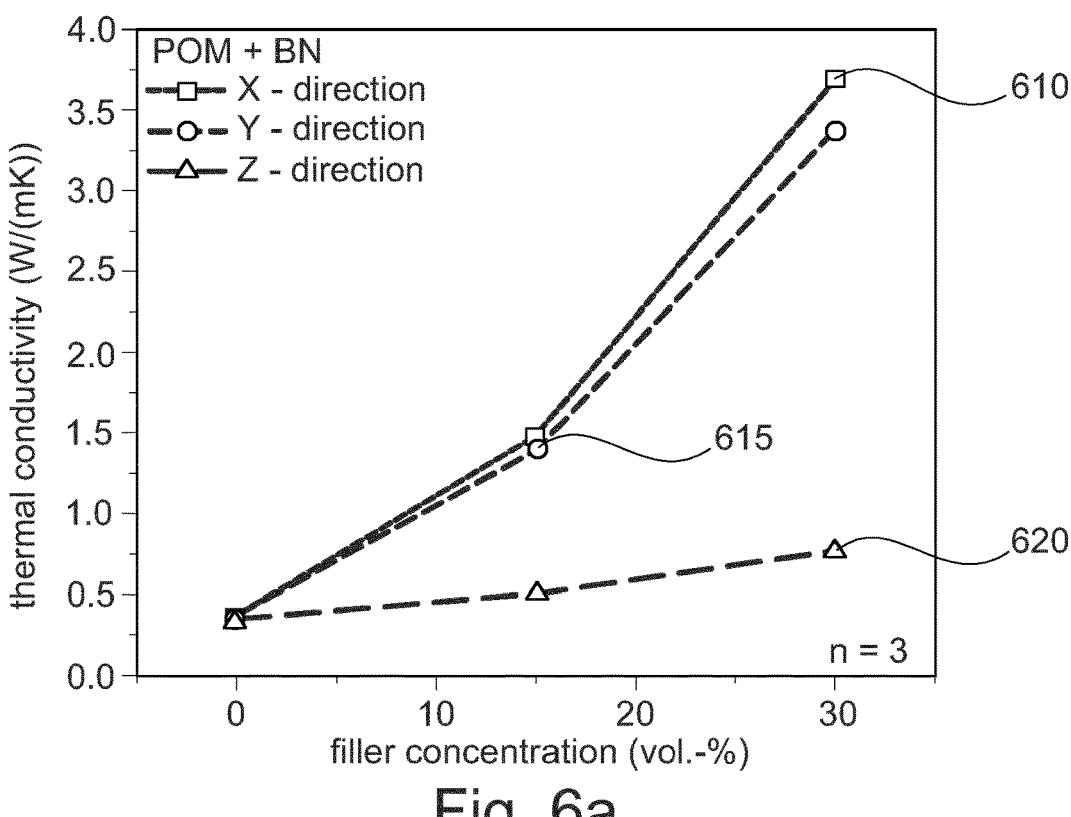

6a-6d. These values were investigated for the three directions X, Y and Z, wherein X describes an injection direction, Y displays an orthogonal plane direction and Z marks a through plane:

FIG. 6a shows the thermal conductivity of a mixture of POM and BN as filler material, wherein curve 610 describes X (squares), curve 615 describes Y (circles) and curve 620 describes Z (triangles).

Figure 6B:
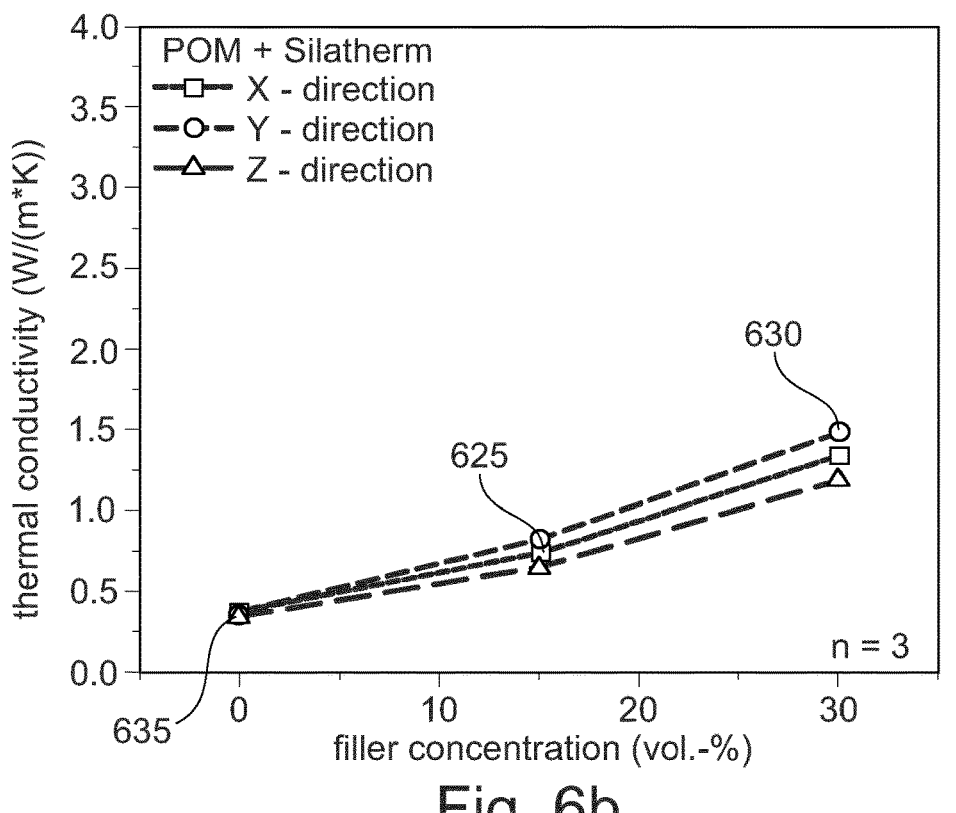

FIG. 6b shows the thermal conductivity of a mixture of POM and SILATHERM® as filler material, wherein curve 625 describes X (squares), curve 630 describes Y (circles) and curve 635 describes Z (triangles).

Figures 6C, 6D:
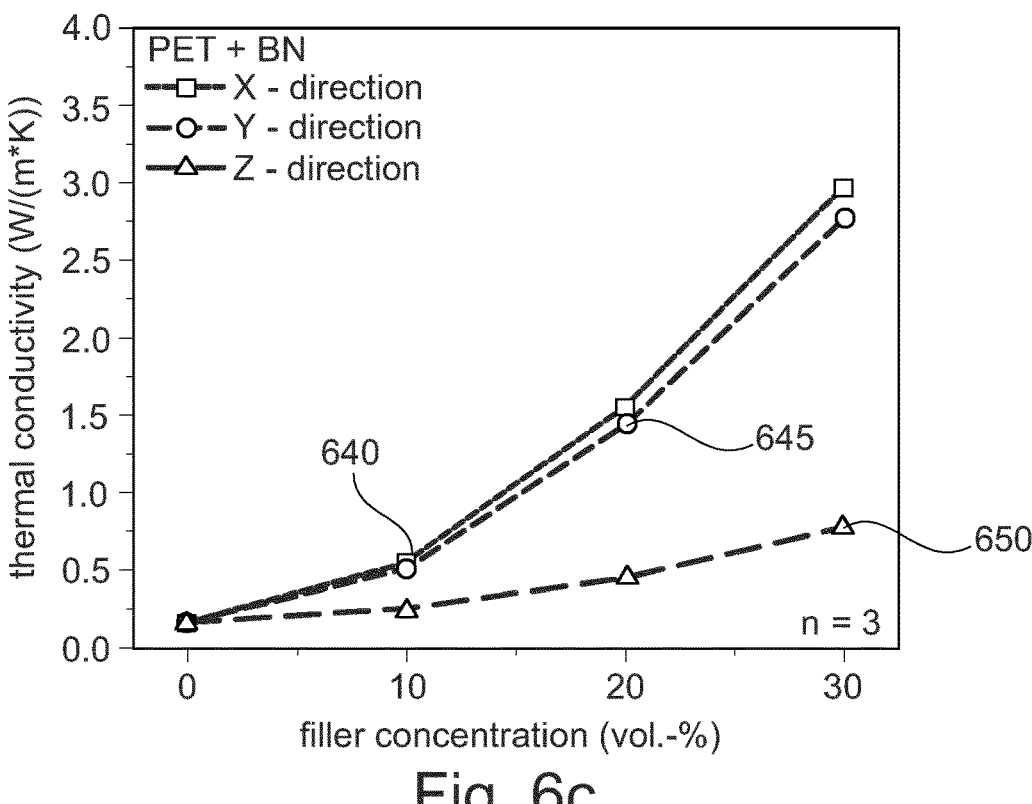

FIG. 6c shows the thermal conductivity of a mixture of PET and BN as filler material, wherein curve 640 describes X (squares), curve 645 describes Y (circles) and curve 650 describes Z (triangles).

FIG. 6d shows the thermal conductivity of a mixture of PET and SILATHERM® as filler material, wherein curve 655 describes X (squares), curve 660 describes Y (circles) and curve 665 describes Z (triangles).

For both filler materials in FIGS. 6a-6d, the thermal conductivity rises with increasing filler concentration. In combination with the platelet-shaped BN, the thermal conductivity in X- and Y-direction is significantly increased while a rather small improvement is measured in Z-direction. This behavior may be caused by a combination of filler orientation and the geometry dependent thermal conductivity of fillers. In the injection molding process, the platelet-shaped fillers may be predominantly oriented in the X-Y plane, which is a result of the occurring shear and expansion flows in the injection molding process. Additionally, BN shows a thermal conductivity of 400 W/m·K along the planes, while it is only 2 W/m·K through plane. For POM values up to 3.70 W/m·K in X-direction and 0.76 W/m·K in Z were measured. For PET a maximum of 2.97 W/m·K in X is relatively low, while the maximum of 0.77 W/m·K in Z is similar.

In combination with the irregularly cubic shaped SILATHERM®, the components show a more isotropic thermal conductivity. In contrast to BN, the thermal conductivity of SILATHERM® is equal for all filler directions. However, the maximum achievable values are lower. This may be caused by the smaller thermal conductivity of SILATHERM® of 14 W/m·K. For the combination of POM with SILATHERM®, a maximum of 1.48 W/m·K was measured. For PET, however, the highest value of thermal conductivity was 1.16 W/m·K. This may be caused by the comparable lower thermal conductivity of the matrix material PET.

As presented the components with BN show higher values of thermal conductivity compared to the combinations with SILATHERM®. This may be caused by the differing intrinsic thermal conductivity of the fillers.

Next, the improvement of process cycle time by the use of modified mold materials is investigated. Here, unfilled POM and PET were used as mold material. FIG. 7 shows the temperatures measured inside the welded foam and mold during heating and cooling. All given temperatures are displayed relative to the minimum temperature required for a sufficient fusion $T_{fuse}$.

If POM is used as sold mold material (curve 710), the maximum temperature of the foam exceeds $T_{fuse}$ by 18%. The mold's peak temperature was 43%. The process cycle is finished after 432 s. For PET as mold material (curve 720), the peak in foam temperature is 115%. The mold reaches a maximum temperature of only 39%. The demolding temperature (curve 730) in the foam is achieved after 413 s. The maximum temperatures reached in foam (curves 710 and 720) and mold (curves 740 and 750) are 4% higher for the use of POM. Due to POM's higher thermal conductivity, the foam temperature may be reduced faster in the beginning. As soon as the foam temperature reaches 75% of $T_{fuse}$ cooling is equal for both mold materials. For lower temperatures, the cooling becomes faster for PET. This may be caused by the higher temperature difference between foam and mold for PET. It could be seen that the largest part of one cycle may be consumed by passive cooling. For the unfilled mold materials cooling takes 393 s (PET), respectively 412 s (POM). This may be caused by the low thermal conductivity of foam and mold material. The 20 s of heating are comparably short, independent of the mold material.

FIGS. 8*a* and 8*b* show filler concentrations of 15 and 30% by volume for BN together with POM or PET. Here, the temperature measured inside the foam and the mold for the modified POM is shown in FIG. 8*a*. With increasing filler content, the foam peak temperature (curves 810, 815 and 820) is slightly lowered. In comparison to the 118% of $T_{fuse}$ of unfilled POM (curve 810), 113% and in % were measured for POM with 15% by volume of BN and for POM with 30% by volume of BN (curves 815 and 820). At the same time, the temperature inside the mold is lower (curves 840, 845 and 850). Due to the reduction of dielectric loss factor by the thermal conductive fillers, mold peak temperatures of 32% and 31% (curves 845 and 850) of $T_{fuse}$ may be obtained. The combination of enhanced thermal conductivity and lower temperatures of the mold may lead to a significant shortening of the cooling time. While the processing time for POM with 15% by volume of BN is 307 s, it is further decreased to 251 s by the use of 30% by volume of BN. This may mean an effective saving of up 29% respectively 40% of cycle time.

The same analysis was done for PET and 15% by volume of BN in FIG. 8*b*. Compared to the results with POM in FIG. 8*a*, the peak temperature is similar for filled and unfilled mold material (curves 855 and 860). Additionally, the peak temperature of the mold with a mixture of PET and 15% by volume of BN (curve 870) is 4% higher compared to the unfilled mold (curve 865). According to the dielectric characterization, the dielectric loss factor of both materials is quite similar, which might lead to a comparable temperature development. Nevertheless, the enhanced thermal conductivity may result in a faster heat transfer from foam to mold material. This then may result in a higher peak temperature for the thermal conductive mold material. Because of the enhanced thermal conductivity both, foam and mold, may show a faster cooling in the further course. A cycle time of 313 s may be achieved, which equals a reduction of cycle time by 20%.

The skilled person will understand that other filler material(s) or mixtures as mentioned above are also conceivable. For example, the filler material may comprise a dielectric material, in particular a mixture of at least two inorganic materials, preferably at least one of the following: a metal nitride, a metal oxide, a metal carbide, a metal sulfide, a metal silicate, a silicon carbide and silicon nitride, most preferably boron nitride, BN, SILATHERM® (a mixture of $Al_2O_3$ and $SiO_2$) or SILATHERM® Advance. Alternatively or in addition, the filler material comprises at least one of the following: a mixture of a carbon material and an inorganic material, carbon fiber, glassy carbon, carbon nanotubes, carbon nanobuds, aerographite, linear acetylenic carbon, q-carbon, graphene, a salt, a monocrystalline powder, a polycrystalline powder, an amorphous powder, a glass fiber.

As discussed above, all of these described embodiments follow the same idea of achieving optimal properties for efficient molding by dielectric heating of the particle foam part inside the mold and the subsequent cooling of the mold and the particle foam part.

Alternatively or in addition, it is also possible to choose a filler material to get defined physical or mechanical properties in different areas of the component, in particular the particle foam part 120 by the use of an inventive mold according to the present invention. This may include different degrees of fusion in these different areas and thus graded physical or mechanical properties in the particle component 120. For example, different mixtures of the polymer material and the filler material may be used in different areas of the mold. Therefore, such embodiments open up the possibility to provided graded and thus tailored particle foam parts properties in a reproducible manufacturing process.

Summarizing, the use of an inventive mold can therefore not only provide better quality end products, it can also provide significant benefits for the whole molding process like reduced cycle times, so that the overall productivity can be increased.

The invention claimed is:

1. A mold for molding a component, in particular a particle foam part, the mold comprising:
   a. a mixture of a polymer material and a filler material,
   b. wherein the filler material is adapted to allow a heating of the component inside the mold by means of an electromagnetic field and increase the permittivity of the mold compared to the component, wherein the polymer material comprises a foamed material.

2. A mold for molding a component, in particular according to claim 1 and in particular a particle foam part, the mold comprising:
   a. a mixture of a polymer material and a filler material,
   b. wherein the filler material is adapted to allow a heating of the component inside the mold by means of an electromagnetic field and increase the thermal conductivity of the mold.

3. A mold for molding a component, in particular a particle foam part, the mold comprising:
   a. a mixture of a polymer material and a filler material,
   b. wherein the filler material is adapted to allow a heating of the component inside the mold by means of an electromagnetic field and increase the permittivity of the mold compared to the component, wherein the filler material comprises a dielectric material, in particular a mixture of at least two inorganic materials, preferably at least one of the following: a metal nitride, a metal oxide, a silicon carbide and silicon nitride.

4. The mold of claim 1, wherein the filler material comprises at least one of the following: a salt, a monocrystalline powder, a polycrystalline powder, an amorphous powder, a glass fiber.

5. The mold of claim 1, wherein the mixture comprises the filler material in an amount of 10 to 40% by volume.

6. The mold of claim 1, wherein the polymer material comprises a thermoplastic material, preferably at least one of the following: polyethylene terephthalate, PET, polybutylene terephthalate, PBT, polyoxymethylene, POM, polyamide-imide, PAI, polycarbonate, PC, polyketones, PK, polyether ether ketone, PEEK, or polyethylene, PE.

7. The mold of claim 1, wherein the polymer material is adapted to increase the permittivity of the mold compared to the component.

8. The mold of claim 1, wherein the polymer material is adapted to increase the dielectric loss factor of the mold.

9. The mold of claim 1, wherein the mold is a mold for a component of one of the group packaging material, thermal isolation elements and mechanical functional elements, or isolation panels for buildings and also as thermal isolation elements in automotive and/or in fuel cell apparatus.

10. A mold for molding a component, in particular a particle foam part, the mold comprising:

a. a mixture of a polymer material and a filler material, b. wherein the filler material is adapted to allow a heating of the component inside the mold by means of an electromagnetic field and increase the permittivity of the mold compared to the component, wherein the electromagnetic field is in the radio frequency range of 25-30 MHz.

11. A method for manufacturing a component, in particular a particle foam part, the method comprising the step of a. molding the component using a mold according to claim 1.

12. The method of claim 11, further comprising at least one of the following steps:

b. loading the mold with a first material for the component which comprises particles of an expanded material; and c. heating the first material and/or the mixture of the polymer material and the filler material of the mold and/or a susceptor of the mold by means of the electromagnetic field.

13. The method of claim 12, wherein the susceptor comprises at least one of the following materials: expanded polypropylene, ePP, polyurethane, PU, polylactide, PLA, polyether-block-amide, PEBA, or polyethylene terephthalate, PET.

14. The method of claim 12, wherein the heating step comprises the step of fusing the surfaces of the particles.

15. The method of claim 12, wherein the particles for the component comprise at least one of the following materials: expanded thermoplastic polyurethane, eTPU, expanded polyamide, ePA, expanded polyetherblockamide, ePEBA, polylactide, PLA, polyether-block-amide, PEBA, polyethylene terephthalate, PET, polybutylene terephthalate, PBT, thermoplastic polyester ether elastomer, TPEE.

16. The method of claim 12, wherein the particles comprise of a foamed material.

17. The method of claim 11, wherein the electromagnetic field is in the radio frequency range of 25-30 MHz.

18. The method of claim 12, wherein the mold is further loaded with a second material, which remains essentially unaltered by the electromagnetic field.

19. A component, in particular a particle foam part, manufactured with a method according to claim 11.

20. A mold for molding a component, in particular a particle foam part, the mold comprising:

a. a mixture of a polymer material and a filler material, b. wherein the filler material is adapted to allow a heating of the component inside the mold by means of an electromagnetic field and increase the permittivity of the mold compared to the component, wherein the filler material comprises a dielectric material, in particular a mixture of at least two inorganic materials, preferably at least one of the following: a metal carbide, a metal sulfide, a metal silicate, most preferably boron nitride, BN, or the filler material comprises at least one of the following: a mixture of a carbon material and an inorganic material, glassy carbon, carbon nanotubes, carbon nanobuds, aerographite, linear acetylenic carbon, q-carbon, graphene or the polymer material comprises a foamed material.

21. The mold according to claim 1, wherein the mold is formed of the mixture of the polymer material and the filler material.

22. The mold according to claim 1, wherein the mold is formed of the polymer material, and the filler material is a solid additive incorporated into the polymer material.

\* \* \* \* \*